(12) United States Patent
Trimberger

(10) Patent No.: US 7,590,956 B1
(45) Date of Patent: Sep. 15, 2009

(54) METHODS OF DETECTING UNWANTED LOGIC IN AN OPERATIONAL CIRCUIT DESIGN

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 273 days.

(21) Appl. No.: 11/818,007

(22) Filed: Jun. 13, 2007

(51) Int. Cl.
  *G06F 17/50* (2006.01)
(52) U.S. Cl. .......................................... 716/5
(58) Field of Classification Search ........................ 716/5
  See application file for complete search history.

(56) References Cited

U.S. PATENT DOCUMENTS

| | | | |
|---|---|---|---|
| 7,096,439 B2 * | 8/2006 | Tsai et al. ........................ | 716/5 |
| 7,250,821 B2 * | 7/2007 | Momii et al. ................ | 331/1 A |
| 7,409,670 B1 * | 8/2008 | Pritchard et al. .............. | 716/17 |
| 2008/0148073 A1 * | 6/2008 | Ball et al. .................... | 713/194 |

OTHER PUBLICATIONS

J. Di and S. Smith, "Detecting Malicious Logic through Structural Checking," in Proc. IEEE Region 5 Technical Conf., Fayetteville, Arkansas, Apr. 20-21, 2007.*

* cited by examiner

*Primary Examiner*—Jack Chiang
*Assistant Examiner*—Brandon W Bowers
(74) *Attorney, Agent, or Firm*—Lois D. Cartier

(57) ABSTRACT

Methods of detecting unwanted logic in an integrated circuit (IC) design. Any unwanted logic added to a design (e.g., to monitor or interfere with operation of the design) will draw power from one or more power supplies on the IC. Hence, by monitoring power drawn from various portions of a circuit design implemented in an IC, the unwanted logic can be detected and reported to the user. One way of monitoring power draw is by the use of oscillator circuits. If power goes down locally (e.g., due to the operation of unwanted logic), the frequency of an oscillator circuit in that vicinity will be reduced relative to the frequencies of other oscillator circuits in the design, and/or relative to an expected value. When a variation in the relative power consumption is detected, unwanted logic can be inferred and an error signal is output.

20 Claims, 3 Drawing Sheets

METHODS OF DETECTING UNWANTED LOGIC IN AN OPERATIONAL CIRCUIT DESIGN

FIELD OF THE INVENTION

The invention relates to security methods in electronic circuits. More particularly, the invention relates to methods of detecting unwanted logic that may be inserted into an electronic circuit.

BACKGROUND

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

For all of these PLDs, the functionality of the device is controlled by data bits (the "configuration bitstream") provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

PLD designs can include millions of logic gates, and therefore can be very complicated. Hence, a common method of designing for a PLD includes incorporating pre-developed logic blocks ("cores") into the design. A core can include a predetermined set of configuration bits that program the PLD to perform one or more functions. Alternatively, a core can include source code or schematics that describe the logic and connectivity of a design. Typical cores can provide, but are not limited to, digital signal processing (DSP) functions, memories, storage elements, and math functions. Some cores include an optimally floorplanned layout targeted to a specific family of PLDs. Cores can also be parameterizable, i.e., allowing the user to enter parameters to activate or change certain core functionality.

Developers of PLD applications are becoming increasingly reliant on outside core developers or "IP providers" for components of their systems. In some sensitive applications, developers may be concerned that an IP provider could include in a core additional logic designed to monitor or even interfere with the functionality of the design. To provide one simple example, a PLD design used in a ATM (automatic teller machine) system could include in one of its cores "Trojan horse" logic that allows a specific cardholder to withdraw cash from an account without reporting the transaction to the bank.

Therefore, it is desirable to provide methods by which PLD users can detect any such unwanted logic that has been added to their designs. It is further desirable to provide similar methods for nonprogrammable circuits, as nonprogrammable circuits may also include sub-circuits provided by unaffiliated design sources.

SUMMARY

The invention provides methods of detecting unwanted logic in a circuit design. An expected relative power consumption is determined for various portions of the circuit design, and a means for monitoring power consumption of the various portions is included in the circuit design. When the circuit design is a programmable logic device (PLD) design, the design including the means for monitoring is then programmed into the PLD. While the circuit design is in operation, the relative power consumption of various portions of the circuit design is monitored, e.g., by monitoring power levels as reflected by the operating frequencies of oscillators distributed throughout the design. When a variation in the relative power consumption is detected, a signal is output that indicates that unwanted logic may have been added to the circuit design after the expected relative power consumption was determined. This unwanted logic may be, for example, logic to monitor or interfere with the desired functionality of the circuit design.

According to one embodiment, the method includes inserting two or more oscillator circuits into the circuit design, and determining an operating frequency for each oscillator circuit. The operating frequencies can be determined, for example, by programming the circuit design into a PLD and measuring the operating frequencies from the PLD, or by simulating the circuit design. From the determined operating frequencies, an expected pattern of relationships among the operating frequencies can be determined, and a means for monitoring the relative operating frequencies of the oscillator circuits relative to the expected pattern of relationships can be included in the circuit design. For example, the means for monitoring may be one or more monitor circuits, each of which compares the operating frequencies of two of the oscillator circuits.

The circuit design is then monitored during operation. When the relationship between two monitored frequencies varies from the expected pattern (e.g., changes from A>B to A<B, for example, where A and B are the frequencies of two of the oscillator circuits), an error signal is output that indicates the presence of unwanted logic in the circuit design. To account for variation in circuit activity in the circuit design, the means for monitoring may generate an error only during specific checking times or conditions.

In other embodiments, instead of or in addition to comparing the relationships between the frequencies of two or more oscillator circuits, the operating frequency of a single oscillator circuit is compared to a predetermined value reflecting the expected operating frequency when no unwanted logic is present. When the monitored frequency varies from the expected frequency by a predetermined amount (e.g., 20 percent), the error signal is provided.

BRIEF DESCRIPTION OF THE DRAWINGS

The present invention is illustrated by way of example, and not by way of limitation, in the following figures.

DETAILED DESCRIPTION OF THE DRAWINGS

Figure 1:
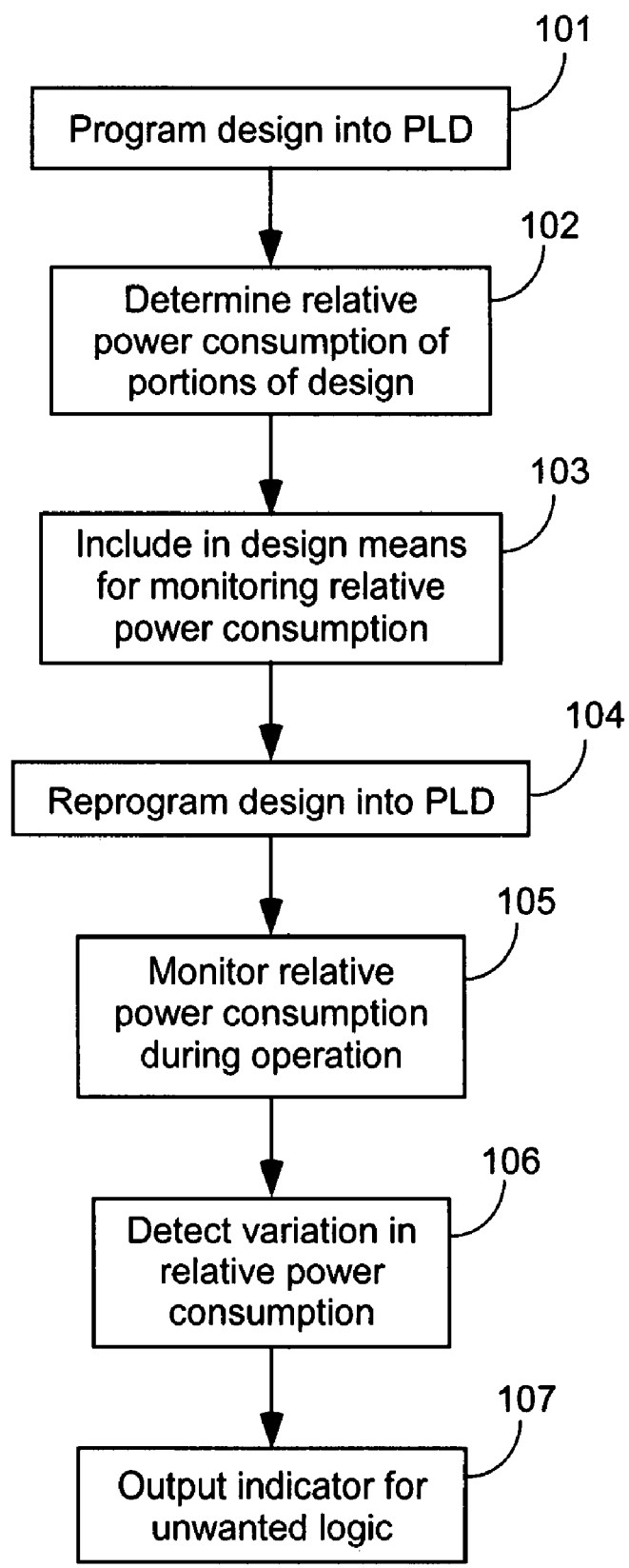
FIG. 1 illustrates the steps of a first method of detecting unwanted logic in a circuit design, according to one embodiment of the present invention.

The present invention is applicable to a variety of integrated circuits (ICs). The present invention has been found to be particularly applicable and beneficial for programmable logic devices (PLDs). Therefore, an appreciation of the present invention is presented by way of specific examples utilizing PLDs such as field programmable gate arrays (FPGAs). However, the present invention is not limited by these examples, and can be applied to any IC, including non-programmable ICs.

The methods of the invention take advantage of the requirement that any unwanted logic added to an IC design will draw power from one or more power supplies on the IC. Hence, by monitoring power drawn from various portions of a circuit design implemented in an IC, the unwanted logic can be detected and reported to the user. One way of monitoring power draw is by the use of oscillator circuits. If power goes down locally (e.g., due to the operation of unwanted logic), the frequency of an oscillator circuit in that vicinity will be reduced relative to the frequencies of other oscillator circuits in the design, and/or relative to an expected value, due to local heating or IR drop.

Thus, in one embodiment, multiple oscillators are added to the circuit design, and distributed among the logic. In a circuit design with separate power supply regions, one oscillator may be added to each power region. Monitor circuits are also added to the design, and can be spaced (for example) between the oscillators. These monitor circuits can watch for variations in power draw between expected values and values actually measured during operation of the circuit design, or values derived from accurate simulations. For example, a first oscillator may have a simulated frequency of "A", and a second oscillator may have a simulated frequency of "B", with A greater than B (A>B). If during operation the monitor circuits report that B is greater than A, it may be deduced that unwanted logic has begun to operate in the circuit.

In one embodiment, the monitor circuits include comparators that are first run in a training phase to determine the outputs during correct operation. This training phase may be conducted in a simulation, preferably with delays back-annotated into the simulation from physical design. For an accurate training phase, voltage drop in power supplies and or temperature-sensitivity may be modeled. Alternatively or additionally, the training phase may be run by implementing the design (e.g., loading a PLD design into the PLD) and executing it with known data, temperature and voltage.

During the training phase, oscillators run normally. The comparators receive an additional signal "training". When training is asserted, the oscillator values are compared and the resulting difference is stored as the correct result. If the training phase is done with simulation, the correct results may be extracted from the simulation and inserted into the design specification. If the training phase is done on the integrated circuit itself, the result may be extracted and inserted into the subsequent design specification or the result may be stored in the IC. In some embodiments, where the IC is a PLD, a training phase may be performed every time the PLD powers-up or periodically during operation. In other embodiments, only one training phase is performed.

Subsequently, when the comparison is made when not in training mode, the result is exclusive-ORed with the stored correct result. The output of the exclusive-OR is used as the "error" signal for that comparator.

FIG. 1 illustrates the steps of a first method of detecting unwanted logic in a circuit design, according to an exemplary embodiment of the present invention. In the pictured embodiment, the circuit design is a PLD design. In step 101, the circuit design is programmed into the PLD. In step 102, the relative power consumption of various portions of the design is determined, e.g., by measuring the operating frequencies of two or more oscillator circuits distributed among the logic of the circuit design, or by measuring the relative operating frequencies of the two or more oscillator circuits. By this means, an expected signature, or an expected pattern of power consumption, can be determined. The "training" method described above can be used, if desired, to perform step 102.

In other embodiments, the expected signature is determined by simulation, and not by programming the circuit design into a PLD. This method may be preferred, for example, when the IC is an application specific integrated circuit (ASIC). However, simulation can also be used to determine the expected signature for PLD designs, if preferred.

In step 103, means for monitoring the relative power consumption of the various portions of the design are incorporated into the circuit design. For example, expected values or relationships may be programmed or hard-wired into the design, e.g., as part of a compare circuit. The results of the monitor circuits can then be compared to each other or to expected values:

In step 104, the altered design, now including the means for monitoring, is reprogrammed into the PLD. When the circuit design is not a PLD design, the altered design may be implemented in some other fashion, e.g., as an ASIC.

In step 105, the circuit design is placed into operation, and the relative power consumption is monitored during the circuit operation. In step 106, a variation in relative power consumption is detected. In step 107, an indicator is output (e.g., displayed, stored, or passed to another portion of the system including the IC) that indicates the possible presence of unwanted logic.

Figure 2:
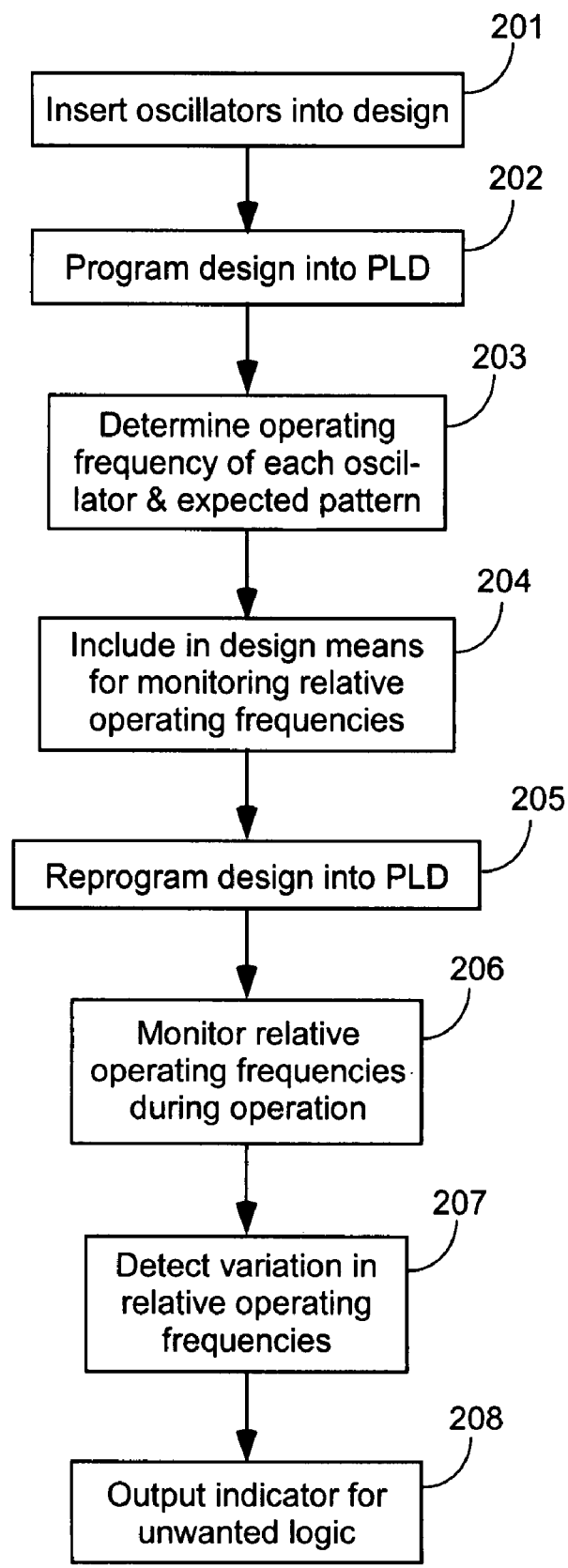
FIG. 2 illustrates the steps of a second method of detecting unwanted logic in a circuit design, according to another embodiment of the present invention.

FIG. 2 illustrates the steps of a second method of detecting unwanted logic in a circuit design, according to another embodiment of the present invention. In the pictured embodiment, the circuit design is a PLD design. In step 201, oscillators are inserted into the circuit design. For example, the oscillators may be distributed throughout the design to provide good coverage of the existing logic, or they may be distributed throughout the PLD to ensure that no unwanted logic can be added in otherwise unused portions of the PLD. The oscillators can be inserted into the PLD design before or after compilation. For example, the oscillators can be inserted into the compiled bitstream, if desired, thereby ensuring that access to the compiler does not provide a means of bypassing the described methods. In some embodiments, the oscillators are hard-coded in the PLD, i.e., included as part of the hardware fabric of the PLD itself.

In step 202, the circuit design is programmed into the PLD.

In step 203, the operating frequency of each oscillator is determined to derive an expected pattern of relationships among the operating frequencies of the various oscillators, or an expected signature for the oscillator circuits. The "training" method described above can be used, if desired, to perform step 203.

In other embodiments, the expected signature is determined by simulation, and not by programming the circuit design into a PLD. This method may be preferred, for example, when the IC is an application specific integrated circuit (ASIC).

In step 204, means for monitoring the relative operating frequencies of the various portions of the design are incorporated into the circuit design. For example, expected values or relationships may be programmed or hard-wired into the design, e.g., as part of a compare circuit. The results of the monitor circuits can then be compared to each other or to expected values. The monitor circuits can be inserted into the PLD design before or after compilation. For example, the monitor circuits can be inserted into the compiled bitstream, if desired, thereby ensuring that access to the compiler does not provide a means of bypassing the described methods.

In step 205, the altered design, now including both the oscillators and the means for monitoring, is reprogrammed into the PLD. When the circuit design is not a PLD design, the altered design may be implemented in some other fashion, e.g., as an ASIC.

In step 206, the circuit design is placed into operation, and the relative operating frequencies are monitored during the circuit operation. In step 207, a variation in relative operating frequencies is detected. In step 208, an indicator is output (e.g., displayed, stored, or passed to another portion of the system including the IC) that indicates the possible presence of unwanted logic.

Note that normal temperature and power variations may cause the oscillator circuits to change frequencies, potentially triggering an erroneous error signal. This effect can be minimized by comparing the oscillator frequencies to each other, rather than to predetermined values or variation limits (e.g., variations by up to a predetermined percentage of the expected value). Other embodiments minimize false errors by only checking or accepting error indications at specific times.

Data dependencies may cause variation in power consumption across the circuit design. In some embodiments, these variations are minimized by using complementary signaling methods, which are well known. Further, "test points" (monitor circuit locations) may be selected to minimize variations due to changes in function or data values, e.g., by selecting locations that are shown to have minimal variation.

To reduce the incidence of incorrect indicators (e.g., the frequency with which step 208 outputs an erroneous indicator), in some embodiments an error signal is not generated when only a single variation is detected. In these embodiments, more than one variation must be detected in order to output an indicator. For example, FIG. 3 illustrates one such circuit design.

Figure 3:
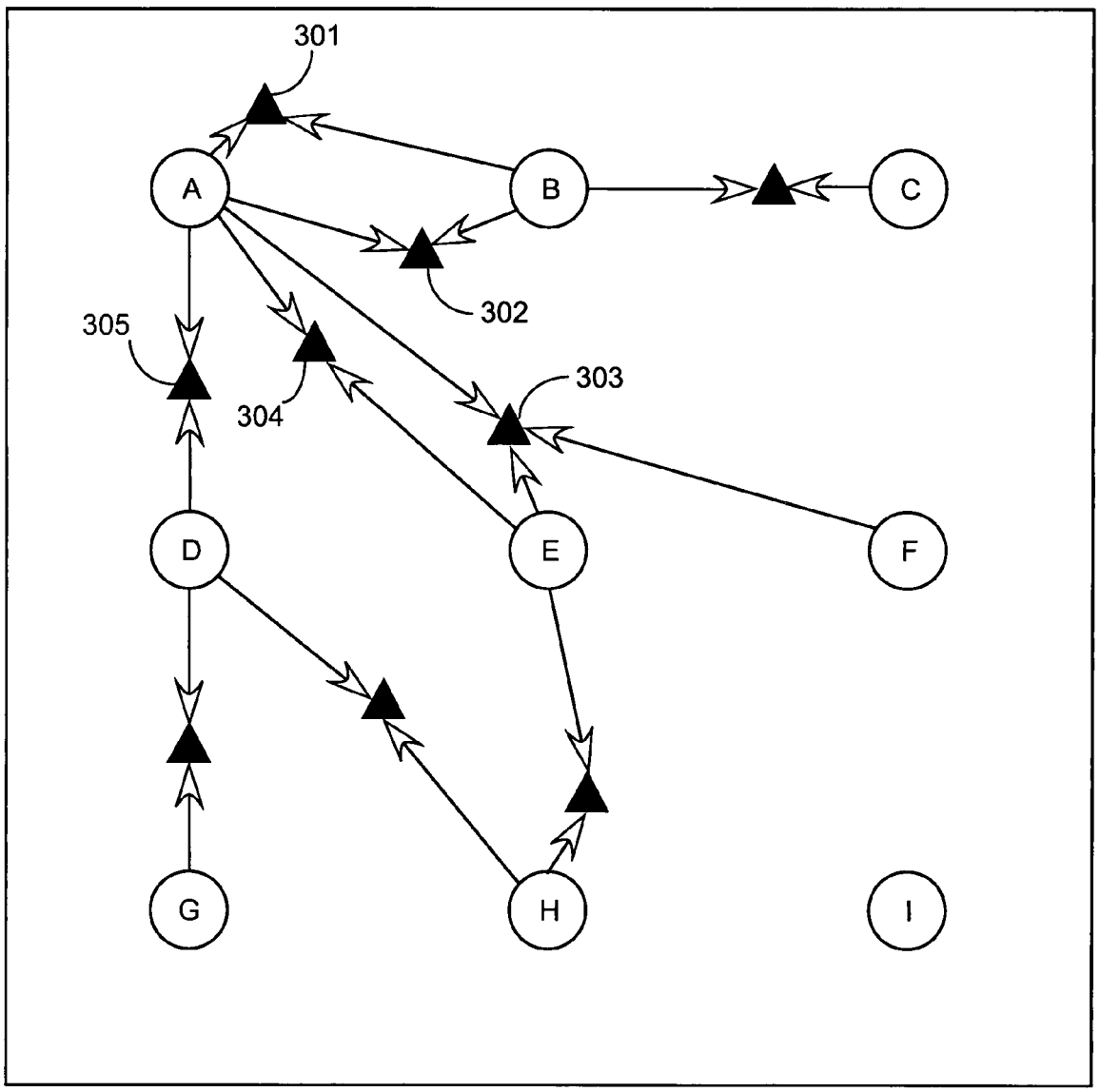
FIG. 3 illustrates an exemplary integrated circuit to which the methods of FIGS. 1 and 2 can be applied.

FIG. 3 illustrates an integrated circuit to which the methods of FIGS. 1 and 2 can be applied. The circuit design of FIG. 3 includes nine oscillators A-I, evenly spread throughout the design. (In other embodiments, there are fewer or more than nine oscillators, and they need not be spread evenly throughout the design.) The black triangles such as 301-305 designate monitor circuits. In the pictured embodiment, each monitor circuit is driven by two of the oscillators, and performs a compare function between the frequencies of the two oscillators. For example, monitor circuit 301 compares the frequencies of oscillators A and B. However, monitor circuit 302 also compares the frequencies of oscillators A and B. In the pictured embodiment, an error signal is not output unless both monitor circuits 301 and 302 show a change in the relative frequencies of the two oscillators, to reduce the chance of a false positive error signal. Further, oscillator A is compared not only to oscillator B, but also to oscillators D and E. In the pictured embodiment, an error signal indicating the presence of unwanted logic near oscillator A is not output unless all of monitor circuits 301-305 signal show that oscillator A is running more slowly than expected. The technique of comparing each oscillator to more than one other oscillator also reduces the chance of a false positive error signal.

This invention can be embodied in other forms without departing from the spirit or essential attributes thereof. Accordingly, reference should be made to the following claims, rather than to the foregoing specification, as indicating the scope of the invention.

What is claimed is:

1. A method of detecting unwanted logic in a circuit design, the method comprising:
    inserting a plurality of oscillator circuits into the circuit design;
    determining an operating frequency of each oscillator circuit and determining therefrom an expected pattern of relationships among the operating frequencies;
    including in the circuit design a means for monitoring relative operating frequencies of the oscillator circuits relative to the expected pattern of relationships;
    implementing the circuit design in an integrated circuit;
    monitoring the relative operating frequencies among the oscillator circuits during operation of the circuit design implemented in the integrated circuit;
    detecting, as a result of the monitoring, a variation between the relative operating frequencies and the expected pattern of relationships; and
    outputting, in response to the detecting, an indicator indicating a presence of the unwanted logic.

2. The method of claim 1, wherein the circuit design comprises a user circuit targeted to a programmable logic device (PLD), and wherein the implementing comprises:
    programming the PLD with the circuit design including the plurality of oscillator circuits and the means for monitoring.

3. The method of claim 1, wherein outputting the indicator indicating the presence of the unwanted logic comprises:
    outputting the indicator when the operating frequency of a first one of the oscillator circuits exceeds the operating frequency of a second one of the oscillator circuits.

4. The method of claim 1, wherein:
    the means for monitoring relative operating frequencies of the oscillator circuits relative to the expected pattern of relationships comprises a plurality of monitor circuits, each monitor circuit comparing the operating frequencies of two of the oscillator circuits.

5. The method of claim 1, wherein determining the operating frequency of each oscillator circuit and determining therefrom an expected pattern of relationships among the operating frequencies comprises measuring the operating frequencies from another integrated circuit that includes the circuit design.

6. The method of claim 1, wherein determining the operating frequency of each oscillator circuit and determining therefrom an expected pattern of relationships among the operating frequencies comprises operating another integrated circuit that includes the circuit design in a training phase that comprises:

comparing the operating frequencies one to another; and storing results of the comparing as expected results.

7. The method of claim 1, wherein determining the operating frequency of each oscillator circuit and determining therefrom an expected pattern of relationships among the operating frequencies comprises simulating the circuit design including the oscillator circuits.

8. A method of detecting unwanted logic in a circuit design, the method comprising:

determining expected relative power consumption of various portions of the circuit design;

including in the circuit design means for monitoring the relative power consumption of the various portions of the circuit design;

implementing the circuit design in an integrated circuit;

monitoring, via the means for monitoring, the relative power consumption of the various portions of the circuit design implemented in the integrated circuit while the circuit design is in operation;

detecting, via the monitoring, a variation in the relative power consumption of the various portions of the circuit design, compared to the expected relative power consumption; and outputting, in response to the detecting, an indicator indicating the presence of the unwanted logic in the circuit design.

9. The method of claim 8, wherein the circuit design comprises a user circuit targeted to a programmable logic device (PLD), and wherein the implementing comprises:

programming the PLD with the circuit design including the means for monitoring.

10. The method of claim 8, wherein:

the circuit design comprises a plurality of oscillator circuits;

determining the expected relative power consumption of various portions of the circuit design in the integrated circuit comprises determining relative frequencies for the oscillator circuits;

monitoring the relative power consumption of the various portions of the circuit design comprises monitoring operating frequencies of the oscillator circuits.

11. The method of claim 10, wherein:

detecting the variation in the relative power consumption of the various portions of the circuit design comprises comparing the monitored operating frequencies and detecting changes in compare output values.

12. The method of claim 11, wherein:

outputting the indicator indicating the presence of the unwanted logic in the circuit design comprises outputting the indicator only when more than one variation is detected.

13. The method of claim 8, wherein determining the expected relative power consumption of the various portions of the circuit design comprises measuring the operating frequencies from another integrated circuit that includes the circuit design.

14. The method of claim 8, wherein determining the expected relative power consumption of the various portions of the circuit design comprises simulating the circuit design.

15. The method of claim 8, wherein monitoring the relative power consumption of the various portions of the circuit design comprises monitoring operating temperatures of the various portions of the circuit design.

16. A method of detecting unwanted logic in a circuit design, the circuit design including a plurality of oscillator circuits, the method comprising:

implementing the circuit design in an integrated circuit;

deriving an expected signature for the oscillator circuits when the circuit design is in operation;

monitoring an operating frequency of each of the oscillator circuits during operation of the circuit design implemented in the integrated circuit;

comparing the monitored operating frequencies to the expected signature;

detecting a variation between the monitored operating frequencies compared to the expected signature; and outputting, in response to the detecting, an indicator indicating a presence of the unwanted logic in the circuit design.

17. The method of claim 16, wherein the circuit design comprises a user circuit targeted to a programmable logic device (PLD), and wherein the implementing comprises:

programming the PLD with the circuit design including the plurality of oscillator circuits.

18. The method of claim 16, wherein:

the expected signature for the oscillator circuits comprises relative frequencies between at least two of the oscillator circuits; and detecting the variation between the monitored operating frequencies compared to the expected signature comprises detecting a change in the relative frequencies of the at least two oscillator circuits.

19. The method of claim 18, wherein:

monitoring the operating frequency of each of the oscillator circuits comprises comparing frequencies of the at least two oscillator circuits during operation of the circuit design; and detecting the variation comprises receiving an unexpected output value from the comparing the frequencies of the at least two oscillator circuits.

20. The method of claim 16, wherein:

the expected signature for the oscillator circuits comprises an expected frequency for at least one of the oscillator circuits; and detecting the variation between the monitored operating frequencies compared to the expected signature comprises detecting a deviation in the operating frequency of the at least one oscillator circuit from the expected frequency by at least a predetermined amount.

* * * * *